G. BOURGADE.
Improvement in the Manufacture of Bitartrate of Potassa.
No. 130,407.
Patented Aug. 13, 1872.
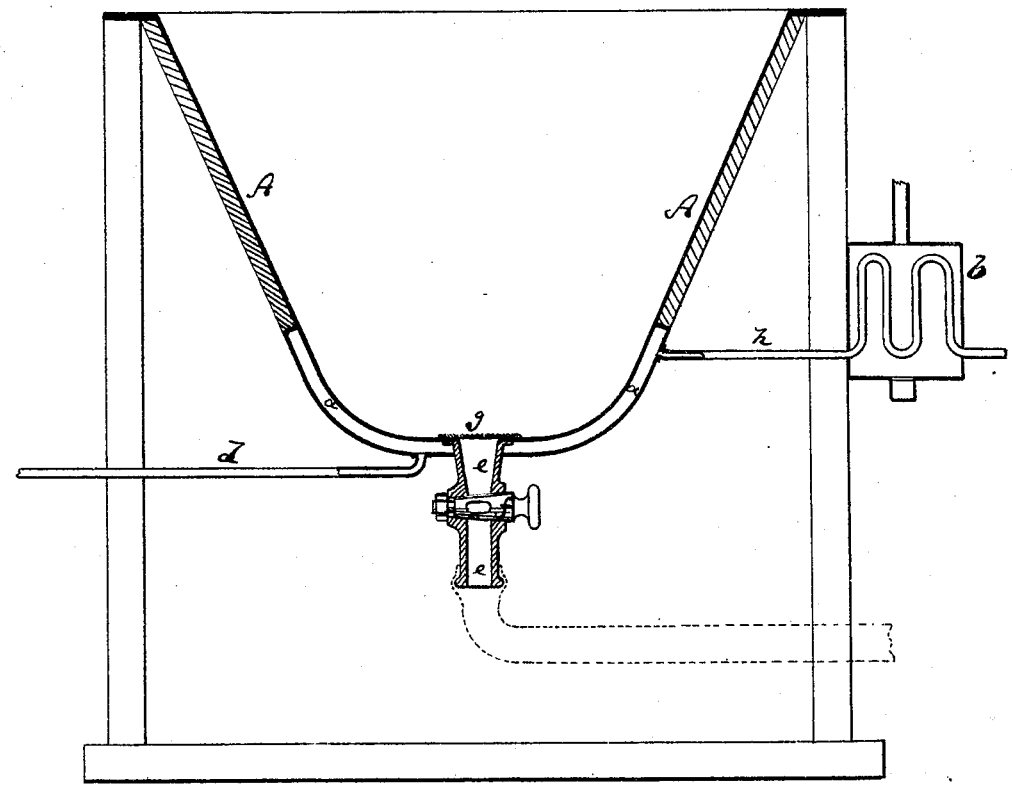

UNITED STATES PATENT OFFICE.

GUSTAVE BOURGADE, OF JERSEY CITY, NEW JERSEY.

IMPROVEMENT IN THE MANUFACTURE OF BITARTRATE OF POTASSA.

Specification forming part of Letters Patent No. 130,407, dated August 13, 1872.

Specification describing a new and Improved Process of and Apparatus for Preparing Bitartrate of Potash, invented by GUSTAVE BOURGADE, of Jersey City, in the county of Hudson and State of New Jersey.

The drawing represents a vertical central section of my improved apparatus for preparing bitartrate of potash.

The object of this invention is to simplify the means of producing cream of tartar or bitartrate of potash, so that the same may be economically manufactured in large quantities.

At present this substance is mostly imported from Europe, where it is prepared by slow and tedious process in kettles heated by direct fire. The adaptation of the same process would make its production in the United States too expensive, and would, owing to the high-priced labor here, preclude competition with foreign producers.

My new apparatus consists principally of a double-jacket steam-kettle, A, made of copper or equivalent material, with its lower part, $a$, hollow, for the admission of steam. The steam is, by preference, superheated in a furnace, $b$, before being conducted in the pipe $h$ into the jacket $a$. $d$ is a pipe for conducting the steam away from the kettle. In the bottom of the kettle is a discharge-pipe, $e$, having a valve, $f$, and covered with a filter, $g$.

My process is as follows: First, I fill the kettle with water, and when it is boiling by the heat of steam admitted into the jacket $a$ I add a sufficient quantity of crude argols, well ground, which are left to boil until perfectly dissolved. In order to prevent the formation of tartrate of lime, likely to take place either from the lime contained in the crude argols or procured by its pressure in the clay used for such preparations, I add a sufficient quantity either of sulphuric or of muriatic acid diluted in five times their quantity of water. When the crude argols under treatment contain a compound of tartrate of lime I add, after pouring the requisite quantity of diluted acid, enough potash, and thus increase the production. I then pour a sufficient quantity of bone-black, contained in muriatic acid, and six times its quantity by weight of water, and leave the entire mixture for about twenty minutes to boil. The quantity of bone-black to be used depends entirely on the state of the coloring matter and water that I am using—from twenty to sixty pounds to each kettle under the above rule. After dissolution I add a quantity of prime American clay well dissolved in water, and continue to pour it into the boiling kettle until the coloring matter has turned white. The quantity used depends also upon the amount of coloring matter. I may say, however, that it varies from two to five per cent.

My process is then completed, and still admitting steam I open the valve $f$ under the kettle, allow the boiling preparation to run into smaller crystallizing-tanks, which are also connected with steam. In these the crystallizing action takes place by gradual cooling. Each tank-crystallizer having a gage (steam) attached to it, I can easily procure a regular decrease of temperature, which is most important for obtaining a regular crystal.

The following are the principal advantages of the above-described process and treatment. By the new arrangement of my apparatus I can afford to make two or three preparations in succession, without danger or delay, which it is impossible to do with direct fire, under the old European process. The use of steam, even when superheated, affords economy in fuel, and time, and labor. The liquid preparation is discharged and filtered at the same time, thus favoring purity in the goods. There is no danger of the goods being burned against the copper.

The action of sulphuric or muriatic acid upon the lime more or less to be found in crude argols is well understood. In the first place, sulphate of lime is formed, which, being insoluble, remains at the bottom of the kettle, where it is easily collected, while chloride of lime is formed in the second case, which helps in cleansing impurities greatly, and may or may not remain inside the filter. I prefer using muriatic acid.

In the crystallizers the chloride of lime is precip'tated together with the clay. The crystal of bitartrate of potash adheres to the sides of the crystallizers, while the water will be quite clear between.

Having thus described my invention, I claim as new and desire to secure by Letters Patent—

1. The apparatus herein described, for bitartrate of potash, provided with the discharge-pipe $e$ and filter $g$, as set forth.

2. The method, substantially as described, of producing bitartrate of potash from argols, with the aid of the ingredients specified.

GUST. BOURGADE.

Witnesses:
A. V. BRIESEN,
T. B. MOSHER.